United States Patent [19]

Förster

[11] 4,199,713
[45] Apr. 22, 1980

[54] INSTALLATION FOR SUPPLYING THE ELECTRIC POWER SUPPLY OF MOTOR VEHICLES

[75] Inventor: Hans-Joachim M. Förster, Stuttgart, Fed. Rep. of Germany

[73] Assignee: Daimler-Benz Aktiengesellschaft, Fed. Rep. of Germany

[21] Appl. No.: 566,190

[22] Filed: Apr. 9, 1975

[30] Foreign Application Priority Data

Apr. 10, 1974 [DE] Fed. Rep. of Germany ....... 2417436

[51] Int. Cl.² ............................................. H02N 3/00
[52] U.S. Cl. ..................................... 322/2 R; 310/306
[58] Field of Search .................. 322/2; 310/4, 10, 11; 321/1.5; 60/320; 290/1, 2

[56] References Cited

U.S. PATENT DOCUMENTS

| | | | |
|---|---|---|---|
| 1,118,269 | 11/1914 | Creveling | 60/320 X |
| 3,137,798 | 6/1964 | Noyes et al. | 310/4 |
| 3,161,790 | 12/1964 | Percival et al. | 322/2 X |
| 3,258,618 | 6/1966 | Spier | 310/11 |
| 3,349,248 | 10/1967 | Garnier | 310/4 X |
| 3,460,524 | 8/1969 | Lazaridis | 310/4 X |
| 3,654,544 | 4/1972 | Angello | 322/2 |

Primary Examiner—Donovan F. Duggan
Attorney, Agent, or Firm—Craig and Antonelli

[57] ABSTRACT

An installation for feeding the electrical power supply system of motor vehicles which contains a generator, a battery as accumulator, and several loads; a thermionic converter operable by means of the fuel of the motor vehicle is thereby provided as generator.

19 Claims, 1 Drawing Figure

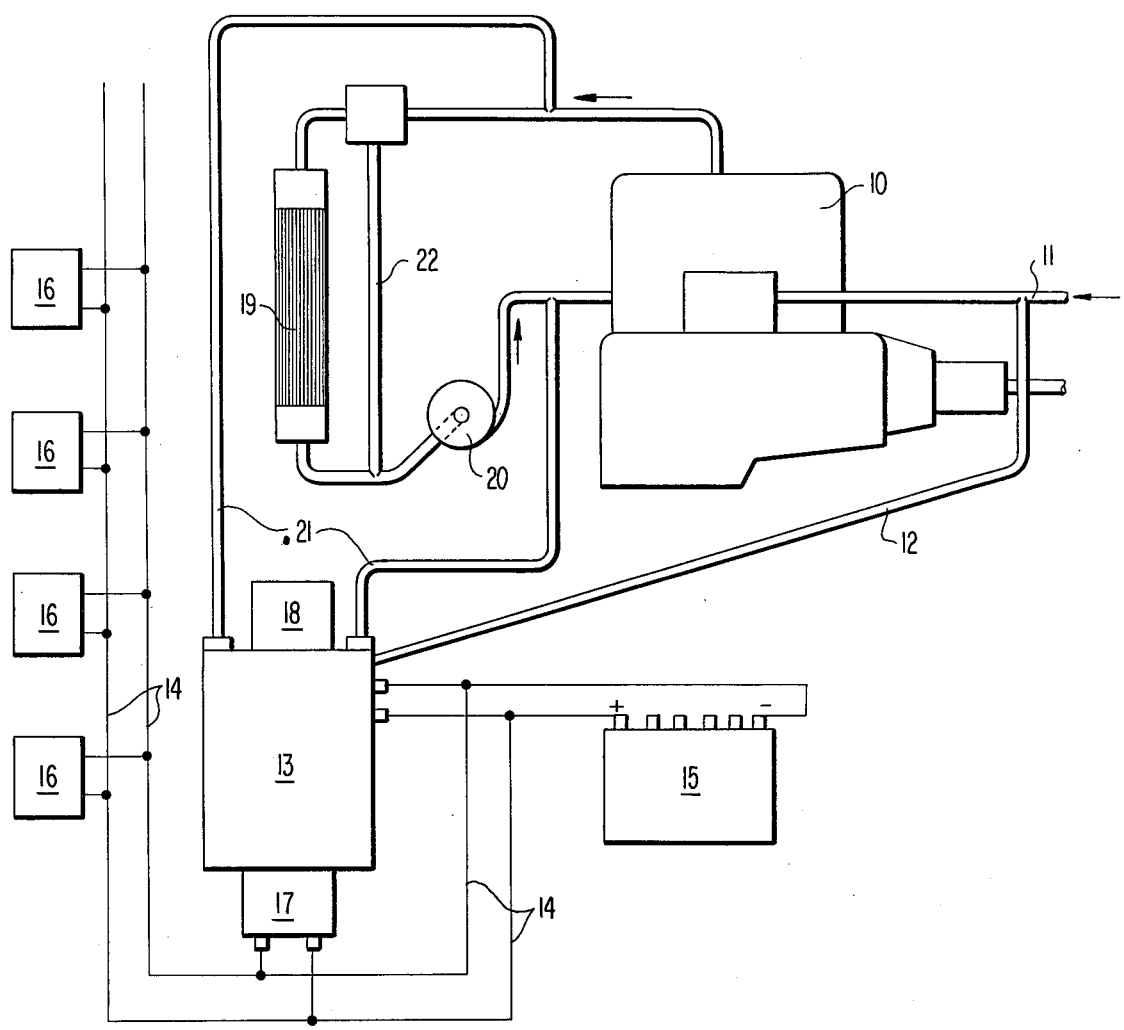

INSTALLATION FOR SUPPLYING THE ELECTRIC POWER SUPPLY OF MOTOR VEHICLES

The present invention relates to an installation for supplying the electric power supply network of motor vehicles which includes a generator, a battery as storage device or accumulator and several loads.

Customarily different loads such as, for example, the ignition system, the injection installation, the starter, the light system, the ventilating system, the air conditioning system as well as under certain circumstances also auxiliary apparatus such as, for example, the radio, are connected to the power supply of motor vehicles. The power supply system is fed in motor vehicles by the internal combustion engine with the aid of a generator, i.e., with the aid of the alternator, whereby a battery is interconnected as storage device or accumulator. This known installation entails a number of disadvantages.

1. The generator supplies current only when the internal combustion engine is running, whereas when the internal combustion stands still, the entire requirement in electrical energy has to be covered by the battery. By reason of the limited capacity of the latter, larger electrical loads cannot be operated in parking vehicles as otherwise the electrical energy supply will fail.

2. The electrical output of a generator is dependent on the rotational speed. It will be generally so designed that at normal rotational speeds it covers the requirement in electrical energy within the vehicle with a slight excess in order to keep the battery charged at all times. This means that at slower rotational speeds of the internal combustion engine such as at idling rotational speed and in city traffic, too little electrical energy is produced whereas at high rotational speeds of the internal combustion engine, when driving on the Autobahn, a power loss occurs.

3. A generator rotating at high rotational speeds is prone to troubles and failures.

4. The efficiency of the overall combination of an internal combustion engine with a generator is very slight in the given case with motor vehicles.

The present invention is therefore concerned with the task to avoid the described disadvantages. This means, an installation is to be proposed, by means of which a direct feeding of the electrical power supply is possible without the technical detour by way of the mechanical work.

The underlying problems are solved according to the present invention in the installations of the aforementioned type in that a thermionic converter of conventional construction which is operable with the fuel of the motor vehicle is provided as generator. In this manner, a direct conversion of the thermal energy which is present in the fuel, into electrical energy is possible without the possibility that the aforementioned disadvantages might occur. Thermionic converters are based on the effect of the thermal emission of electrons from a hot electrode. These apparatus possess already efficiencies according to the present state of the art, which suffice for the given application. Additionally, the advantage results from the present invention that the power supply system inclusive any possibly engaged loads, such as, for example, an air conditioning installation, can now be supplied also when the internal combustion engine stands still. Furthermore, the thermionic converter can be controlled by conventional means independently of the operating condition of the internal combustion engine by the requirements of the power supply system. Finally, such a converter possesses no movable parts so that it is not subjected mechanically to any wear.

It is additionally proposed with the present invention that the thermionic converter is designed for best efficiency at full or rated output and is operated only in the full load range. The consideration of partial load-operation can take place in that according to the present invention the thermionic converter is operated intermittently. The battery, of course, serves thereby as storage device or accumulator. It is possible in this manner to achieve a good efficiency, and additionally a combustion of the fuel low in harmful components results therefrom because the burner in the thermionic converter can be designed for quite a predetermined operating point. A conventional automatic timing means such as a conventional automatic timing circuit for the intermittent operation in dependence on at least the power requirement in the power supply network and on the charge condition of the battery is thereby provided according to the present invention. It is possible in this manner to turn on the converter by this timing circuit or possibly also by a conventional remote control and to cover the requirements of large current loads, for example, of an air-conditioning system, also when the vehicle is parked and non-occupied.

A further feature of the present invention resides in that a fan or blower for supplying the combustion air and a cooling installation are coordinated to the thermionic converter. An electric drive is appropriate for the blower. Both a direct air-cooling system as also a water-cooling system can be used as cooling means whereby the water-cooling is realizable with the assistance of the existing cooling circulatory system in water-cooled engines. It is furthermore feasible within the scope of the present invention, if means are coordinated to the thermionic converter for turning off the fuel supply in case of danger, i.e., for example, in case of overheating or also in case of harmful failures of loads.

Accordingly, it is an object of the present invention to provide an installation for feeding the electric power supply network of motor vehicles which avoids by simple means the aforementioned shortcomings and drawbacks encountered in the prior art.

Another object of the present invention resides in an installation for feeding the electrical power supply system of motor vehicles which does not depend on the operation of the internal combustion engine to cover all possibly occurring requirements for the electrical loads connected thereto.

A further object of the present invention resides in an installation for feeding the electrical power supply of motor vehicles, by means of which a direct feeding of the electrical power supply is possible without the need for first converting the mechanical energy of the internal combustion engine into electrical energy.

Still a further object of the present invention resides in an installation for feeding the electrical power supply of motor vehicles which excels by simplicity and high efficiency.

Another object of the present invention resides in an installation for feeding the electrical power supply system of motor vehicles which will operate even when the internal combustion engine stands still.

A further object of the present invention resides in an installation of the type described above which is not subjected to mechanical wear of the parts, thereby increasing the reliability of operation.

These and further objects, features and advantages of the present invention will become more apparent from the following description when taken in connection with the accompanying drawing which shows, for purposes of illustration only, one embodiment of the present invention, and wherein:

The single FIGURE is a schematic view of one embodiment of an installation for feeding the electrical power supply system of motor vehicles in accordance with the present invention, in which structural details as well as details of the spatial arrangement are not taken into consideration for the sake of clarity.

Referring now to the single FIGURE of the drawing, an internal combustion engine 10 is supplied with fuel from a tank (not shown) by way of the line 11. A branch line 12 leads to the thermionic converter 13 which is of any conventional, known construction. The thermionic converter 13 serves for supplying the power supply network 14 with electrical energy, whereby a battery 15 serves as storage or accumulator device. Several loads 16 are connected to the power supply network 14 such as, for example, the lights of the vehicle, the ignition system, the starter, any possibly existing air-conditioning installation, etc.

A small electrical blower or fan 17 is coordinated to the thermionic converter 13, which is also fed from the power supply network 14 and which serves for the supply of the combustion air. Furthermore, a control unit 18 is provided which operates the thermionic converter intermittently. This can take place according to a predetermined time schedule; however, it may also take place automatically in dependence on the load in the power supply network 14 and on the charge condition of the battery 15 and possibly also on other magnitudes. The control unit 18—which may also be remotely controlled by conventional means—then automatically turns off and on again the fuel supply by way of the line 12 and in the latter case also ignites the thermionic converter. Since the control unit 18 involves conventional elements and commercially available components, known as such in the art, a detailed description thereof is dispensed with herein.

The thermionic converter 13 is additionally equipped with a cooling device. This cooling device is constructed in the instant case as water-cooling system and is connected with the already present water cooler or radiator 19 of the internal combustion engine 10. The connection takes place in such a manner that the already present cooling water circulatory pump 20 is able to supply both the cooling circulatory system of the internal combustion engine 10 as also the cooling circulatory system 21 of the thermionic converter 13. This is true also, when the cooling circulatory system of the internal combustion engine proceeds, not by way of the radiator 19, but by way of the by-pass 22. The distribution of the water quantities flowing through the internal combustion engine 10 and through the thermionic converter 13 can be metered by corresponding cross sections.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. An installation for feeding the electrical power supply of motor vehicles, which includes a generator means, a battery as accumulator means and several loads, characterized in that a thermionic converter means is provided as generator means, which is operable with the fuel of the motor vehicle.

2. An installation according to claim 1, characterized in that the thermionic converter means is designed for optimum efficiency at full power output and is operated only in the full load range.

3. An installation according to claim 2, characterized by control means for operating the thermionic converter means intermittently.

4. An installation according to claim 3, characterized in that said control means includes an automatic timing means for the intermittent operation in dependence on at least the power requirement in the power supply and the charge condition of the battery.

5. An installation according to claim 4, characterized in that a blower means is coordinated to the thermionic converter means for supplying combustion air.

6. An installation according to claim 5, characterized in that a cooling means is coordinated to the thermionic converter means.

7. An installation according to claim 6, characterized in that said control means is operable to automatically turn off and on the fuel supply to the thermionic converter means to thereby produce electrical energy in the converter means when the fuel supply is turned on.

8. An installation according to claim 1, characterized by control means for operating the thermionic converter means intermittently.

9. An installation according to claim 8, characterized in that said control means includes an automatic timing means for the intermittent operation in dependence on at least the power requirement in the power supply and the charge condition of the battery.

10. An installation according to claim 1, characterized in that a blower means is coordinated to the thermionic converter means for supplying combustion air.

11. An installation according to claim 1, characterized in that a cooling means is coordinated to the thermionic converter means.

12. An installation according to claim 8, characterized in that said control means is operable to automatically turn off and on the fuel supply to the thermionic converter means to thereby produce electrical energy in the converter means when the fuel supply is turned on.

13. An installation according to claim 1, wherein the motor vehicle is provided with an internal combustion engine, the thermionic converter means being operable independently of the operation of the internal combustion engine.

14. An installation according to claim 13, including a first fuel supply line for supplying fuel from a tank to the internal combustion engine and a second fuel supply line for supplying fuel from the tank to the thermionic converter means.

15. An installation according to claim 13, wherein the internal combustion engine is provided with cooling means for supplying cooling fluid thereto, the cooling means also supplying cooling fluid to the thermionic converter means.

16. An installation according to claim 13, characterized by control means for operating the thermionic converter means intermittently.

17. An installation according to claim 16, wherein the control means includes an automatic timing means for the intermittent operation in dependence on at least the power requirements in the power supply and the charge condition of the battery.

18. An installation according to claim 16, wherein the control means is operable to automatically turn off and on the fuel supplied to the thermionic converter means to thereby produce electrical energy in the converter means when the fuel supply is turned on.

19. An installation according to claim 1, wherein the thermionic converter means forms a portion of a motor vehicle, said thermionic converter means being automatically operable for at least initiating operation thereof.

* * * * *